L. B. YOUNG.
KNIFE ARRESTER FOR MOWERS OR BINDERS.
APPLICATION FILED FEB. 19, 1913.

1,091,105.

Patented Mar. 24, 1914.

Witnesses

Inventor
L. B. Young.
By
Attorneys

UNITED STATES PATENT OFFICE.

LISTEN B. YOUNG, OF GUTHRIE CENTER, IOWA.

KNIFE-ARRESTER FOR MOWERS OR BINDERS.

1,091,105. Specification of Letters Patent. Patented Mar. 24, 1914.

Application filed February 19, 1913. Serial No. 749,495.

*To all whom it may concern:*

Be it known that I, LISTEN B. YOUNG, a citizen of the United States, residing at Guthrie Center, in the county of Guthrie, State of Iowa, have invented certain new and useful Improvements in Knife-Arresters for Mowers or Binders; and I do hereby declare the following to be a full, clear, and exact description of the invention, such as will enable others skilled in the art to which it appertains to make and use the same.

This invention relates to novel and useful improvements in mowing machines and more particularly to an attachment for cutter bars of mowers or binders for providing an elastic cushion for the bars.

The primary object of this invention is to provide a novel and simple device which is capable of attachment to any point of the cutter bar for cushioning the action of the same, thus relieving the cutter bar from a jerky motion and inciting a quick return thereof, so that breaking of the cutter bar is prevented.

With the above objects in view the invention consists of certain novel details of construction and combination of parts hereinafter fully described and claimed, it being understood that various modifications may be made in the minor details of construction within the scope of the appended claims.

Figure 1:
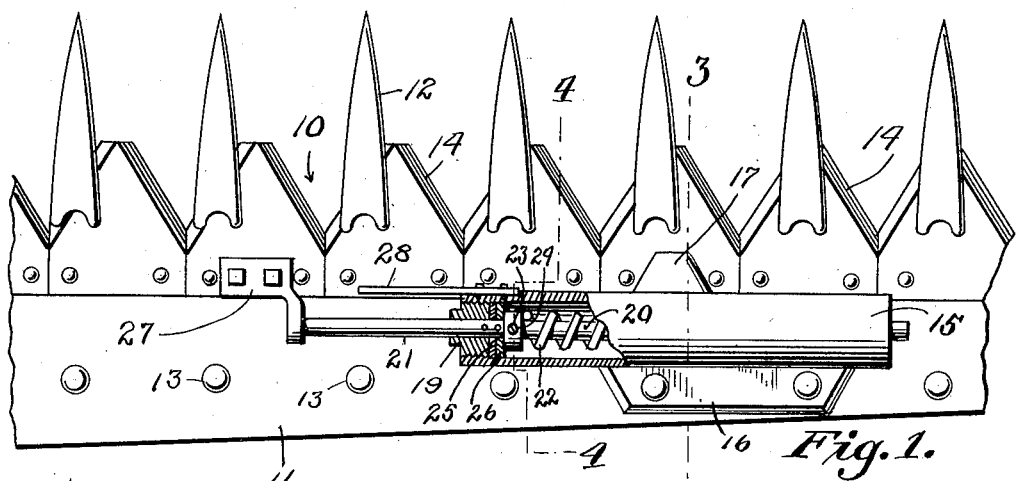
Figure 2:
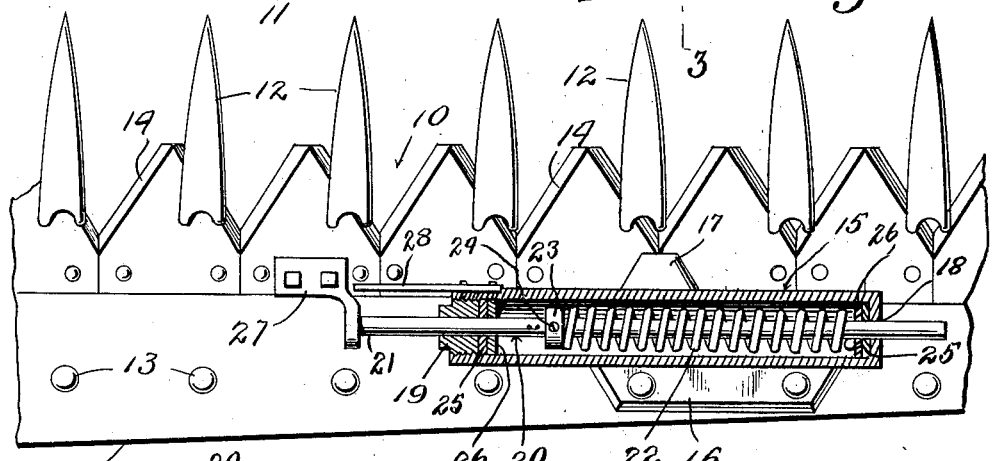
Figure 3:
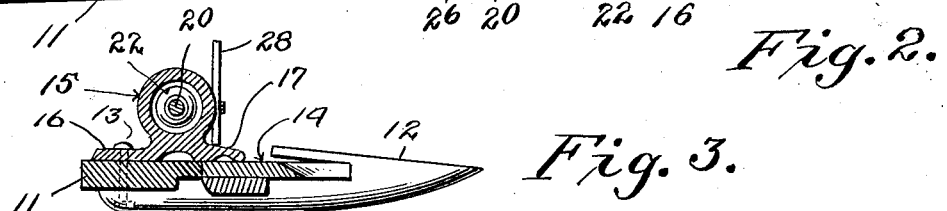
Figure 4:
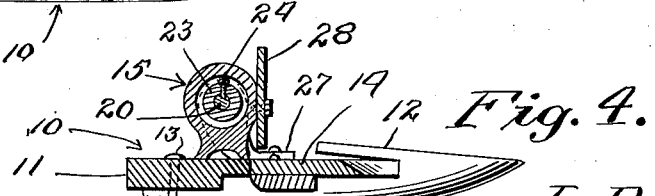

Figure 1 is a top plan view of a fragmentary portion of a cutter bar with the invention applied thereto, part of the device being broken away and the blade being in a drawn position. Fig. 2 is a similar view but with the cylinder of the device in section and showing the cutter bar at the limit of its outward stroke and being cushioned. Fig. 3 is a cross sectional view taken on the line 3—3 of Fig. 1. Fig. 4 is a cross sectional view taken on the line 4—4 of Fig. 1.

In illustrating the preferred embodiment of the invention, a part of the cutter mechanism of a mower or binder is indicated by the numeral 10, the same consisting of a guard bar 11 carrying the guard fingers 12 at suitably spaced intervals, such guard fingers being bolted to the guard bar as shown at 13. The cutter bar consists of a plurality of blades 14 adapted to reciprocate below the heads of the fingers.

The cushioning device consists of a metallic cylinder 15 provided at its base with an attaching flange 16 having a plurality of openings, preferably two in number, attached to certain of the bolts 13 at any desirable place along the guard bar, though preferably at the outer end thereof. The opposite side of the cylinder at the base portion thereof is provided with a projection 17 which overlies the cutter blades and forms in part, a retaining member therefor.

The cylinder is provided with an opening 18 in one end and a plug 19, preferably a screw plug is threaded in the other end. A plunger or rod 20 is slidable through an aperture in the plug and through the opening 18, thus extending through the cylinder and protruding beyond the ends thereof, one end portion 21 extending considerably outwardly of the cylinder to form an abutting end. A coiled spring 22 is mounted on the plunger 20, the same bearing against one end wall of the plunger cylinder and a collar 23 carried by the plunger spaced from the plug 19, said collar being adjustable along the plunger through the medium of a pin 24 engageable through spaced apertures in the plunger for varying the tension of the spring.

The cylinder is normally filled with oil, felt washers 25 engaged by metallic or iron washers 26 in each end of the cylinder preventing escape of the oil. An angular abutting member 27 is also bolted on to the cutter bar and its projecting end is disposed in contact with the end portion 21 of the plunger whereby the outstroke of the cutter bar will cause continued engagement of said abutment member with the plunger which will act to force the collar 23 against the spring 22 and by compressing the same, form a cushion. The spring will also tend to return the cutter bar to its initial position or return stroke. A guard plate 28 is also bolted to the cylinder to protect the plunger 21 and may be used in conjunction therewith as a positive means for preventing interference by the material tangling thereon. It is also obvious that the device will work either on the right or left cut, by simpling unscrewing the screw plug and reversing the rod.

I claim:

1. The combination with a cutter bar mechanism including a guard bar and its fingers and a cutter bar operable therethrough, of a cushion member for the cutter bar, said cushion member including a cylinder having a flanged portion attached to the guard bar and a projection overlying the cutter bar, a plunger movable through the cylinder, a spring engaged on the plunger and within the cylinder, said plunger having a projecting end and a collar normally engaged by the spring to force the plunger in one direction and an abutment member carried by the cutter bar to engage the plunger and compress the spring.

2. The combination with a cutter bar mechanism including a guard bar and its fingers and a cutter bar operable therethrough; of a cushion member for the cutter bar, said cushion member including a cylinder carried by the guard bar and a projection overlying the cutter bar, a plunger movable through the cylinder, a spring engaged on the plunger and within the cylinder, said plunger having a projecting end and a collar normally engaged by the spring to force the plunger in one direction, an abutment member carried by the cutter bar to engage the plunger and compress the spring and a guard plate carried by the cylinder to protect the plunger from the material cut.

In testimony whereof, I affix my signature, in the presence of two witnesses.

LISTEN B. YOUNG.

Witnesses:
LELA M. YOUNG,
S. H. YOUNG.

Copies of this patent may be obtained for five cents each, by addressing the "Commissioner of Patents, Washington, D. C."